United States Patent
Lisowski et al.

(10) Patent No.: US 12,367,278 B2
(45) Date of Patent: Jul. 22, 2025

(54) MULTI-TENANT SECURITY

(71) Applicant: INTERNATIONAL BUSINESS MACHINES CORPORATION, Armonk, NY (US)

(72) Inventors: Tyler Lisowski, Austin, TX (US); Spencer Thomas Reynolds, Austin, TX (US); Francisco Javier Rodriguez, Austin, TX (US); Kodie Glosser, Austin, TX (US); Dennis Warne, Pflugerville, TX (US); Lloyd Wellington Mascarenhas, White Plains, NY (US); Matthias Seul, Pleasant Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 17/815,231

(22) Filed: Jul. 27, 2022

(65) Prior Publication Data
US 2024/0037226 A1 Feb. 1, 2024

(51) Int. Cl.
G06F 21/55 (2013.01)
(52) U.S. Cl.
CPC ...... G06F 21/554 (2013.01); G06F 2221/031 (2013.01)
(58) Field of Classification Search
CPC .................................................. G06F 21/554
See application file for complete search history.

(56) References Cited

U.S. PATENT DOCUMENTS

| 8,620,876 | B2 | 12/2013 | Chan et al. |
| 9,411,964 | B1 | 8/2016 | Moritz |
| 9,471,353 | B1 | 10/2016 | Christopher |
| 9,678,774 | B2 | 6/2017 | Khesin |
| 9,779,240 | B2 | 10/2017 | Feroz |
| 9,935,971 | B2 | 4/2018 | Hamilton, II |

(Continued)

FOREIGN PATENT DOCUMENTS

| CN | 106469083 B | 8/2021 |
| EP | 2663948 A | 11/2013 |
| WO | 2021236378 A1 | 11/2021 |

OTHER PUBLICATIONS

Business Wire, "Global Cloud Security Market (2021 to 2026)—by Application, Security Type, Service Model, Deployment, Organization Size, Industry Vertical and Geography—ResearchAndMarkets. com", Aug. 5, 2021, 3 PGS, <https://www.businesswire.com/news/home/20210805005670/en/Global . . . >.

(Continued)

Primary Examiner — Simon P Kanaan
(74) Attorney, Agent, or Firm — Stosch Sabo

(57) ABSTRACT

Described are techniques for multi-tenant security. The techniques include detecting malicious activity on a compromised application in a multi-tenant host. The techniques further include automatically performing a live migration of each tenant of the multi-tenant host to a respective single-tenant host. The techniques further include mitigating the malicious activity on the compromised application that is migrated to a single-tenant host, and automatically performing another live migration of each benign tenant to a new multi-tenant host.

25 Claims, 10 Drawing Sheets

(56) References Cited

U.S. PATENT DOCUMENTS

| | | | |
|---|---|---|---|
| 10,333,981 B2 | 6/2019 | Lee | |
| 10,706,144 B1 | 7/2020 | Moritz | |
| 10,768,965 B1* | 9/2020 | Habusha | G06F 9/45558 |
| 10,938,837 B2 | 3/2021 | Kumar | |
| 11,140,553 B1* | 10/2021 | Taylor | H04W 12/122 |
| 11,233,804 B2 | 1/2022 | Arzani | |
| 2015/0052520 A1 | 2/2015 | Crowell | |
| 2016/0359914 A1* | 12/2016 | Deen | G06F 21/53 |
| 2017/0104718 A1 | 4/2017 | Folco | |
| 2021/0320950 A1 | 10/2021 | Li | |
| 2022/0121741 A1* | 4/2022 | Araujo | G06F 21/566 |
| 2022/0179991 A1 | 6/2022 | Jha | |
| 2022/0191247 A1* | 6/2022 | Dhoble | H04L 9/3226 |

OTHER PUBLICATIONS

IBM, "IBM Cloud Kubernetes Service", 9 PGS, Accessed on May 10, 2022, <htps://www.ibm.com/cloud/kubernetes-service>.

Kocher et al., "Spectre Attacks" Exploiting Speculative Execution, 19 PGS, Access on May 10, 2022.

SelfKey identify Wallet, "All Data Breaches in 2019-2021—An Alarming Timeline", Apr. 7, 2021, 23 PGS, <https://selfkey.org/data-breaches-in-2019/>.

Wikipedia, "Zero-Day (Computing)", 8 PGS, Access May 10, 2022, <https://en.wikipedia.org/wiki/Zero-day_(computing)>.

Notification of Transmittal of the International Search Report and the Written Opinion of the International Searching Authority, or the Declaration for Application PCT/IB2023/056606, Oct. 6, 2023, 12 pages.

* cited by examiner

MULTI-TENANT SECURITY

BACKGROUND

The present disclosure relates to computer security, and, more specifically, to mitigating malicious activity in multi-tenant systems.

Server hosting is an Information Technology (IT) service (e.g., from a cloud service provider) that provides remote access to off-premises virtual or physical servers and associated resources for a monthly subscription or usage-based price. Server hosting lets IT teams provision and use application and data servers without the up-front cost, delays, and labor of purchasing, setting up, managing, and maintaining physical server hardware themselves.

Server hosting can include multi-tenant (e.g., shared) hosting or single-tenant (e.g., dedicated) hosting. In multi-tenant hosting, the resources of one physical server are virtualized and made available to multiple tenants (e.g., users, clients, etc.). In contrast, in single-tenant hosting, a sole tenant has exclusive access to all resources of a single hardware server. Multi-tenant hosting is generally more cost-effective for smaller, simpler projects, whereas single-tenant hosting is generally more favorable for projects requiring more control and/or higher performance (or higher certainty of a certain level of performance).

Despite the benefits provided by multi-tenant systems, multi-tenant systems remain susceptible to cybersecurity threats. In particular, when one tenant is compromised in a multi-tenant system, multiple other tenants can be at risk of infection given their proximity to the compromised tenant via the shared, underlying resources. Thus, when one tenant is exploited in a multi-tenant system, all tenants in the multi-tenant system can lose availability during the mitigation of the one tenant that is exploited.

SUMMARY

Aspects of the present disclosure are directed toward a computer-implemented method comprising detecting malicious activity on a compromised application in a multi-tenant host. The method further comprises automatically performing a live migration of each tenant of the multi-tenant host to a respective single-tenant host. The method further comprises mitigating the malicious activity on the compromised application that is migrated to a single-tenant host. The method further comprises automatically performing another live migration of each benign tenant to a new multi-tenant host.

Advantageously, the aforementioned method mitigates malicious activity on multi-tenant hosts while preserving availability of tenant workloads by (i) migrating tenants to single-tenant hosts capable of performing tenant workloads; and (ii) using a live migration technique to preserve availability during the migration from the multi-tenant host to the single-tenant hosts.

Additional aspects of the present disclosure are directed toward a computer-implemented method comprising detecting an unauthorized clone of a first tenant in a multi-tenant host and automatically isolating tenants of the multi-tenant host in a sandbox container. The method further comprises determining a secure image corresponding to the first tenant and reimaging, using the secure image, the first tenant on a new multi-tenant host. The method further comprises verifying a security of each tenant in the sandbox container, and in response to verifying the security of each tenant in the sandbox container, migrating each tenant from the sandbox container to the new multi-tenant host.

Advantageously, the aforementioned method mitigates malicious activity in the form of unauthorized clones on multi-tenant hosts while preserving availability of tenant workloads. More specifically, by using a sandbox container, the aforementioned method balances availability of tenant workloads with isolation of potentially malicious tenants.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
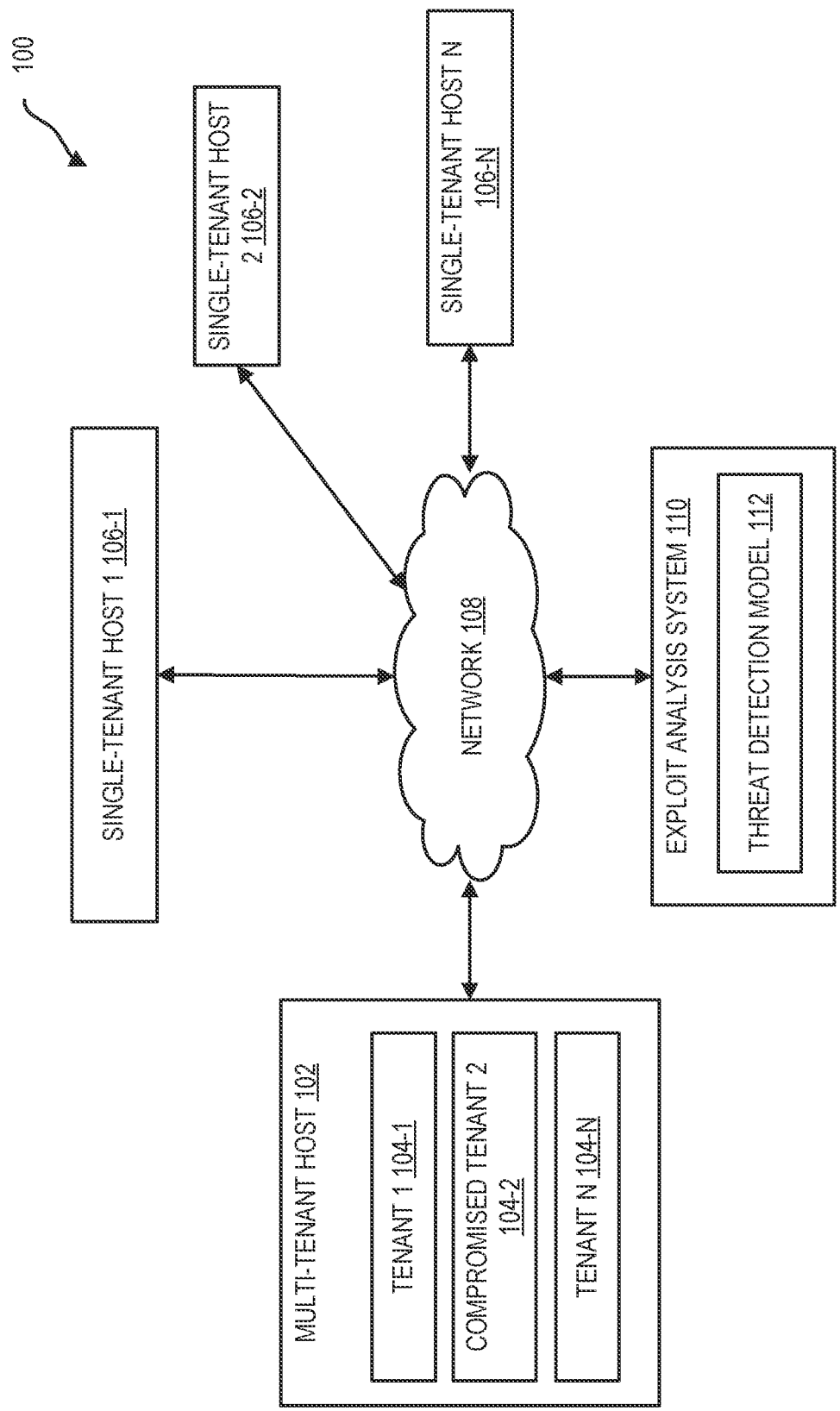
FIG. 1 illustrates a block diagram of an example computational environment implementing multi-tenant security upon identification of a compromised tenant, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward computer security, and, more specifically, to mitigating malicious activity in multi-tenant systems. While not limited to such applications, embodiments of the present disclosure may be better understood in light of the aforementioned context.

Aspects of the present disclosure are directed toward identifying malicious activity on multi-tenant hosts and isolating the detected malicious activity. The malicious activity can be isolated by (i) migrating each tenant of the multi-tenant host to a single-tenant host, and/or (ii) isolating one or more tenants of the multi-tenant host in a sandbox container. Once isolated, aspects of the present disclosure can mitigate the malicious activity (e.g., by terminating an application, deleting an unauthorized clone, etc.). After verifying the benign tenants (e.g., those tenants not infected by the exploit) are, in fact, secure, aspects of the present disclosure can return the benign tenants to a secure multi-tenant host.

Advantageously, aspects of the present disclosure enable malicious activity on multi-tenant hosts to be isolated and mitigated. Furthermore, aspects of the present disclosure preserve availability and functionality of benign tenants (e.g., by hosting the benign tenants on single-tenant servers or in permissioned sandbox containers). Further still, aspects of the present disclosure preserve availability and functionality of benign tenants by using live migration techniques to maintain availability and functionality during the aforementioned migrations.

Referring now to the figures, FIG. 1 illustrates a block diagram of an example computational environment 100 implementing multi-tenant security upon identification of a compromised tenant, in accordance with some embodiments of the present disclosure. The example computation environment 100 includes multi-tenant host 102, multiple single-tenant hosts 106 (e.g., single-tenant host 1 106-1, single-tenant host 2 106-2, single-tenant host N 106-N, where N is any integer greater than or equal to one), and exploit analysis system 110 communicatively coupled by network 108.

The network 108 can be a local area network (LAN), a wide area network (WAN), an intranet, the Internet, or any other network 108 or group of networks 108 capable of continuously, semi-continuously, or intermittently connecting (directly or indirectly) the aforementioned components together.

The multi-tenant host 102, single-tenant hosts 106, and the exploit analysis system 110 can be any computer, server, mainframe, virtual machine (VM), container, tablet, notebook, smartphone, other computer hardware (physical or virtualized), multiples of the aforementioned, and/or combinations of the aforementioned. As will be appreciated by one skilled in the art, FIG. 1 is representative of some embodiments of the present disclosure but should not be construed as limiting. In other embodiments, more or fewer similar or dissimilar components than the components shown in FIG. 1 can be present. Furthermore, in various embodiments, the components shown in FIG. 1, if they are present at all, can be combined together into unified components or separated into discrete components.

Multi-tenant host 102 can comprise computational resources (e.g., computing resources, storage resources, networking resources, etc.) which are shared amongst multiple tenants 104 (e.g., tenant 1 104-1, compromised tenant 2 104-2, tenant N 104-N). In contrast, single-tenant hosts 106 can comprise computational resources (e.g., computing resources, storage resources, networking resources, etc.) which are dedicated to an individual tenant. Exploit analysis system 110 can detect that compromised tenant 2 104-2 is compromised by some type of malicious cyberattack using threat detection model 112.

Threat detection model 112 can be any model now known or later developed for automatically identifying cyber threats, cyber intrusions, cyber attacks, or other malicious behavior from internal actors and/or external actors. In some embodiments, threat detection model 112 maintains (or accesses) a database of known exploit signatures. Such known exploit signatures may be in the form of hashes, digests, or other identifiers of known exploits reduced to a sequence of alphanumeric characters. In some embodiments, such known exploit signatures may be in the form of logged event sequences, hardware events, software events, and/or other events capable of individually or collectively indicating an exploit.

In some embodiments, threat detection model 112 utilizes machine learning to automate the threat detection process. In such embodiments, the threat detection model 112 can employ any number of machine learning algorithms such as, but not limited to, natural language processing (NLP), decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, threat detection model 112 can be configured to perform machine learning on data generated by one or more multi-tenant hosts 102 and/or one or more tenants 104. Such data can include, for example, activity logs, access logs, CPU usages, memory usages, network bandwidth usages, executed instruction set characteristics, and/or other data generated by applications, portals, interfaces, hypervisors, operating systems, virtual machines, containers, and/or other components of multi-tenant hosts 102 and/or tenants 104. The threat detection model 112 can be trained on the aforementioned data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques. After training, the threat detection model 112 can ingest data from multi-tenant host 102 and/or tenants 104 and output identifications of compromised tenants (e.g., compromised tenant 2 104-2).

Figure 2:
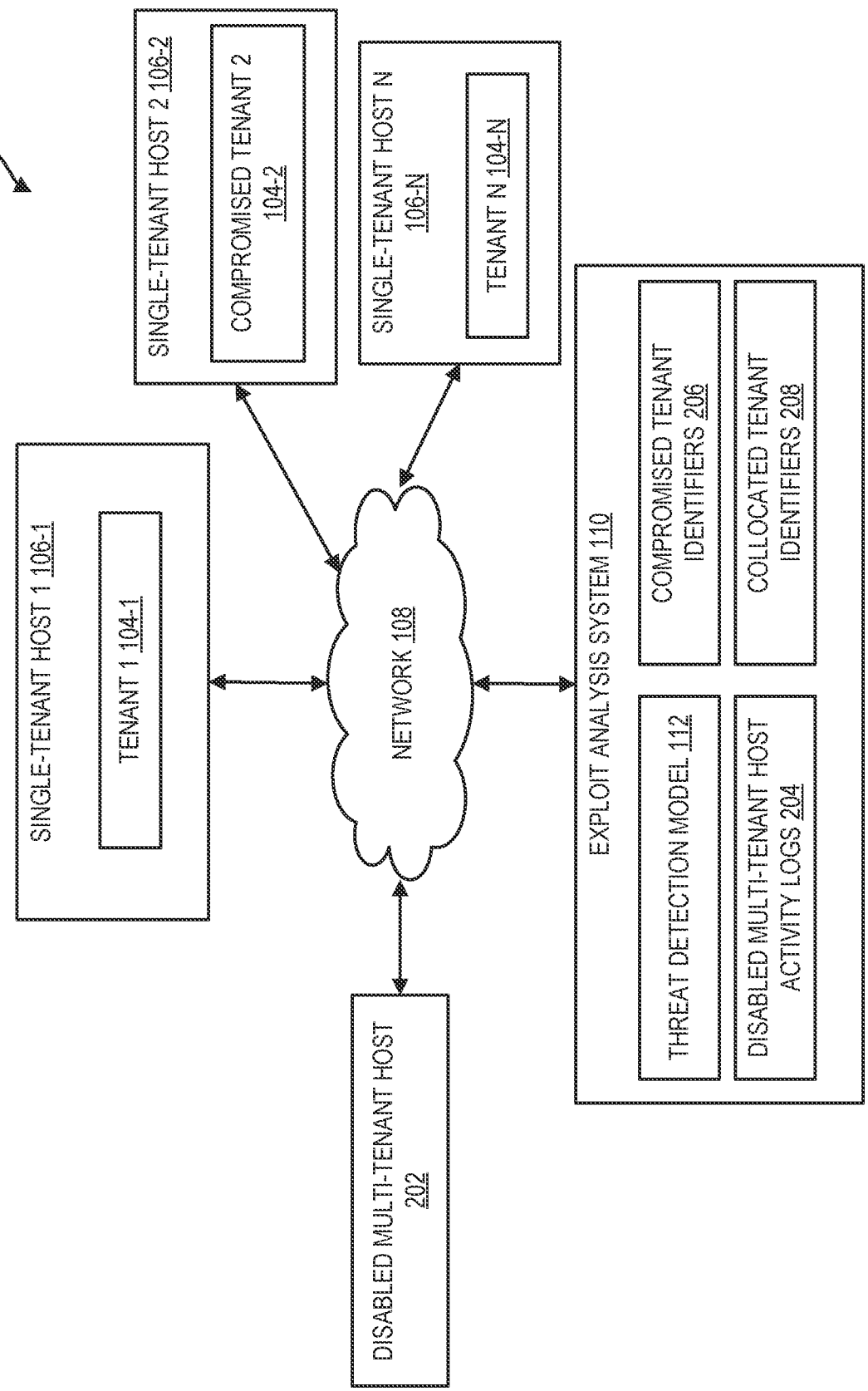
FIG. 2 illustrates a block diagram of an example computational environment implementing multi-tenant security upon live migration of the multiple tenants to single-tenant hosts, in accordance with some embodiments of the present disclosure.

FIG. 2 illustrates a block diagram of an example computational environment 200 implementing multi-tenant security upon live migration of the multiple tenants 104 to single-tenant hosts 106, in accordance with some embodiments of the present disclosure. In some embodiments, the example computational environment 200 is a subsequent view of the example computational environment 100 of FIG. 1. The example computational environment 200 includes the single tenant hosts 106, tenants 104, network 108, exploit analysis system 110, and threat detection model previously described with respect to FIG. 1.

However, in FIG. 2, in response to detecting the compromised tenant 2 104-2, aspects of the present disclosure can perform a live migration of tenants 104 from the multi-tenant host 102 to respective single-tenant hosts 106. Thus, tenant 1 104-1 is migrated to single-tenant host 1 106-1, compromised tenant 2 104-2 is migrated to single-tenant host 2 106-2, and tenant N 104-N is migrated to single-tenant host N 106-N. Meanwhile, multi-tenant host 102 is disabled (as shown by disabled multi-tenant host 202). Advantageously, by performing a live migration of tenants 104 from a multi-tenant host 102 to single-tenant hosts 106, aspects of the present disclosure can (i) limit the spread of a detected exploit (e.g., by isolating compromised tenant 2 104-2 to a single-tenant host 106), and (ii) retain availability of workloads for most (if not all) tenants 104 (e.g., by allowing workloads associated with the tenants 104 to remain functional during and after the live migration).

Furthermore, as shown in the example computational environment 200, the exploit analysis system 110 collects and archives the disabled multi-tenant host activity logs 204. The disabled multi-tenant host activity logs 204 can be retrieved from the disabled multi-tenant host 202 and include event information associated with the multi-tenant host 102 that may be useful to determining the nature of an exploit, the extent of an exploit, and/or preserving tenant information.

The exploit analysis system 110 can further record compromised tenant identifiers 206 and collocated tenant identifiers 208. Compromised tenant identifiers 206 and collocated tenant identifiers 208 can be application identifiers, instance identifiers, VM identifiers, container identifiers, and/or other identifiers useful for differentiating compromised tenants (e.g., compromised tenant 2 104-2 in the case of compromised tenant identifiers 206) from benign tenants hosted on a same multi-tenant host 102 but not themselves exploited (e.g., tenant 1 104-1 and tenant N 104-N in the case of collocated tenant identifiers 208).

Figure 3:
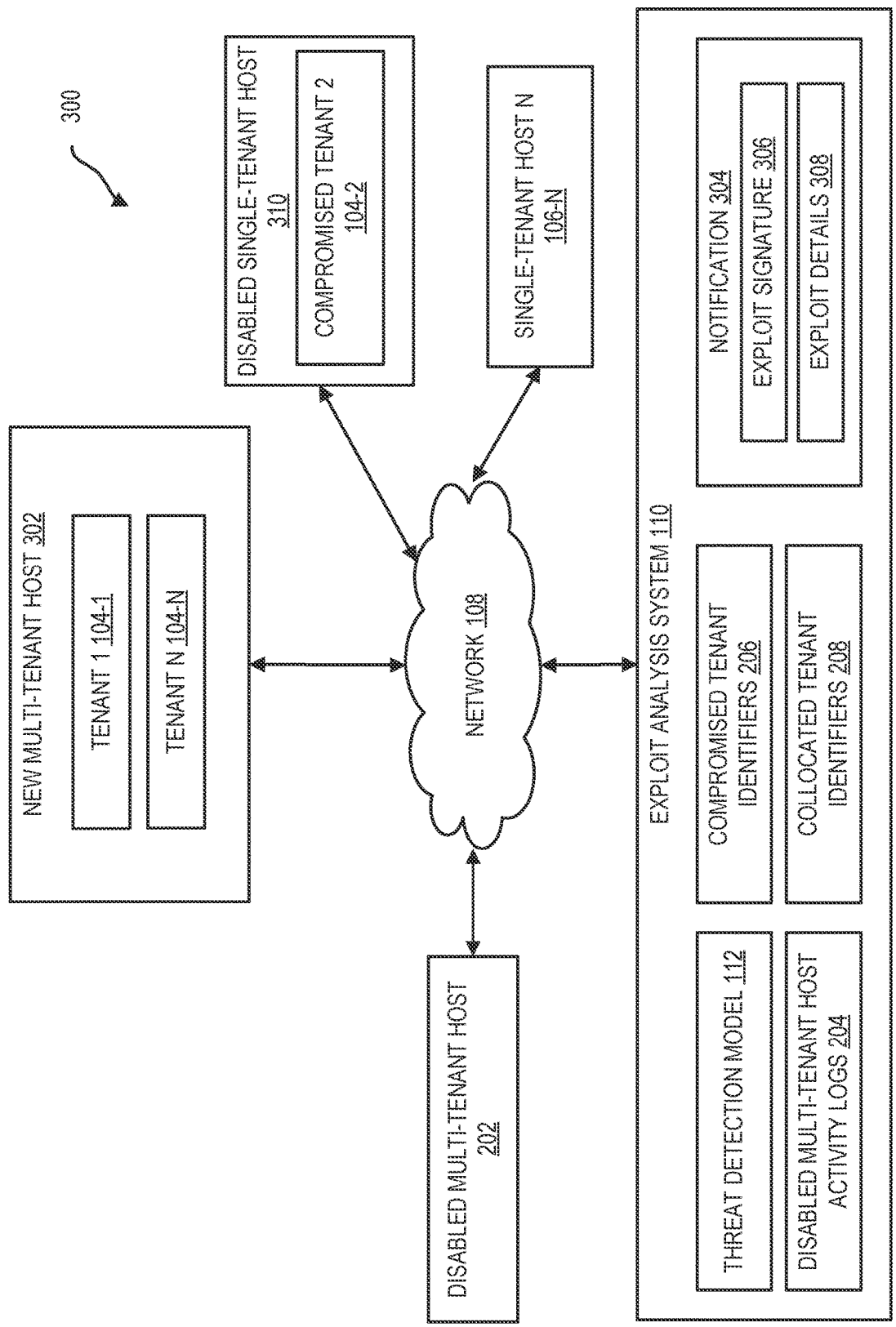
FIG. 3 illustrates a block diagram of an example computational environment implementing multi-tenant security upon live migration of benign tenants to a new multi-tenant host, in accordance with some embodiments of the present disclosure.

FIG. 3 illustrates a block diagram of an example computational environment 300 implementing multi-tenant security upon live migration of benign tenants to a new multi-tenant host 302, in accordance with some embodiments of the present disclosure. In some embodiments, the example computational environment 300 occurs subsequent to the example computational environment 200 of FIG. 2. The example computational environment 300 includes the disabled multi-tenant host 202, tenants 104, single-tenant host N 106-N, network 108, exploit analysis system 110, threat detection model 112, disabled multi-tenant host activity logs 204, compromised tenant identifiers 206, and collocated tenant identifiers 208 previously discussed in FIGS. 1 and 2.

However, FIG. 3 further includes new multi-tenant host 302. The benign tenants (e.g., tenant 1 104-1 and tenant N 104-N) can be live migrated from single-tenant hosts 106 to the new multi-tenant host 302, thereby enabling the benign tenants to be hosted similarly as before the detection of compromised tenant 2 104-2. Although new multi-tenant host 302 is shown as distinct from the disabled multi-tenant host 202 (which is disabled relative to multi-tenant host 102), the new multi-tenant host 302 can, in some embodiments, be a new instance or an otherwise secured version of disabled multi-tenant host 202. In some embodiments, additional testing or monitoring is performed to verify that the benign tenants, are, in fact, benign prior to the live migration of the benign tenants to the new multi-tenant hosts 302.

FIG. 3 further illustrates a notification 304 generated by the exploit analysis system 110. The notification 304 can include information such as an exploit signatures 306 (e.g., a hash, digest, sequence of events, and/or other information indicating a particular exploit) and exploit details 308 (e.g., information related to the disabled multi-tenant host activity logs 204, the compromised tenant identifiers 206, and/or the collocated tenant identifiers 206). In some embodiments, the notification 304 is transmitted to a security administrator which performs a final disposition of the security incidents. For example, the security administrator can confirm the exploit and require the single-tenant host 2 106-2 to become disabled single-tenant host 310 and thereby end workloads associated with compromised tenant 2 104-2. As another example, the security administrator can deem the exploit a false positive, and in such a case, the compromised tenant 2 104-2 can be reclassified as benign and migrated to the new multi-tenant host 302. Regardless, the feedback (e.g., final disposition) of the security administrator can be fed back into the threat detection model 112 for the purposes of refining the parameters associated with the threat detection model. For example, the feedback including the exploit signature 306 and/or the exploit details 308 can be used as a new instance of training data for the threat detection model 112.

Figure 4:
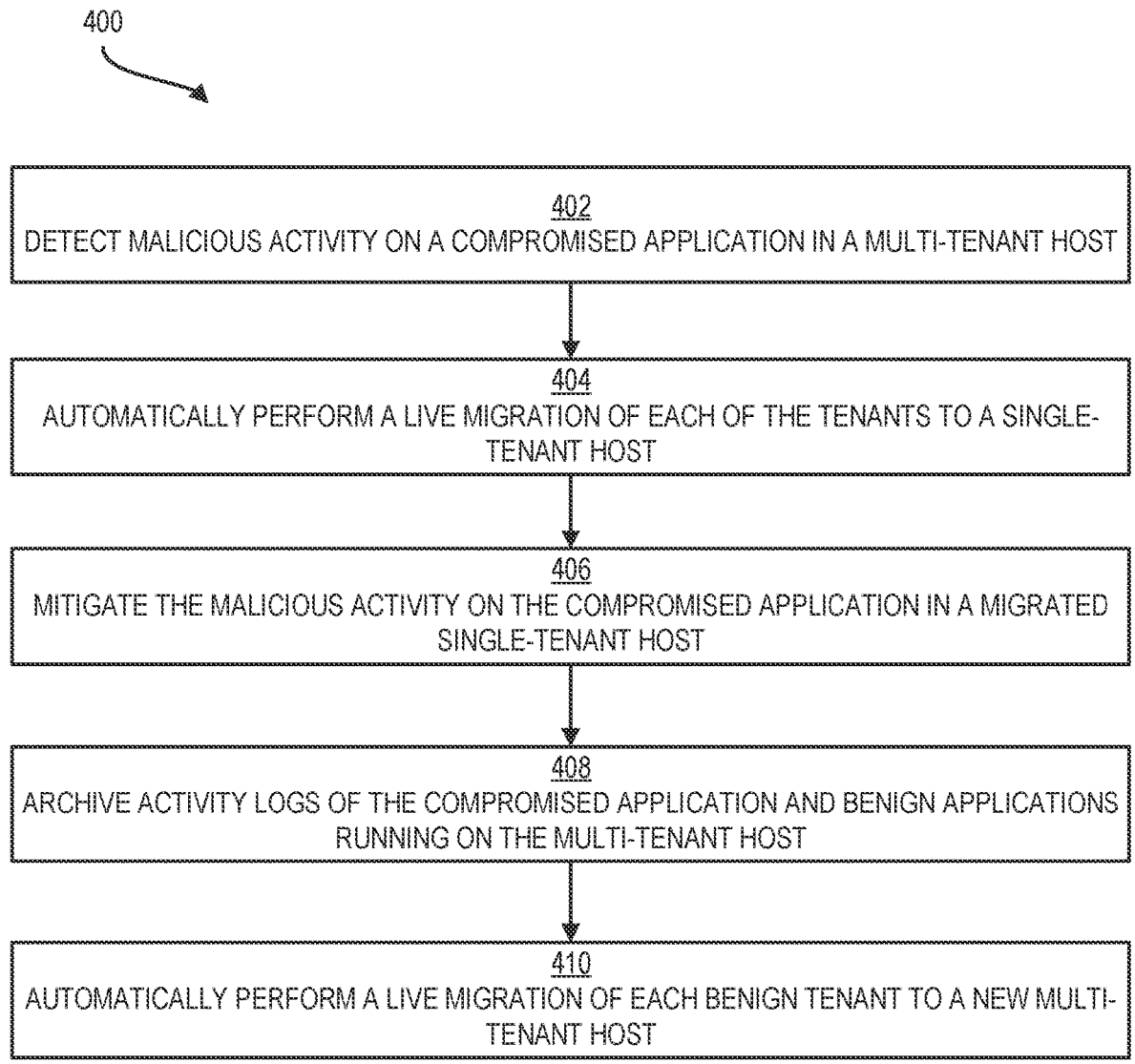
FIG. 4 illustrates a flowchart of an example method for implementing multi-tenant security using single-tenant hosts, in accordance with some embodiments of the present disclosure.

FIG. 4 illustrates a flowchart of an example method 400 for implementing multi-tenant security using single-tenant hosts, in accordance with some embodiments of the present disclosure. In some embodiments, the method 400 is implemented by a multi-tenant cloud security program, an exploit analysis system 110, a server, a computer, a processor, a combination of hardware and software, and/or a combination of any of the aforementioned.

Operation 402 includes detecting malicious activity on a compromised application in a multi-tenant host. The multi-tenant host can be associated with underlying computational resources (e.g., servers) to service workloads from multiple tenants. Thus, the multi-tenant host can include one or more VMs, containers, hypervisors, and/or other virtualization technologies useful for sharing a single set of computational resources amongst multiple tenants. The malicious activity can be detected using a threat detection model. The malicious activity can occur on a single application of a single tenant, multiple applications of the single tenant, or multiple applications of multiple tenants.

Operation 404 includes automatically performing a live migration of each of the tenants to a single-tenant host. Advantageously, a live migration preserves availability of each tenant's applications. As a result, the tenant experiences little to no perceptible downtime during the live migration. The live migration can utilize a pre-copy memory migration technique, a post-copy memory migration technique, or another live migration technique now known or later developed. In the pre-copy memory migration technique, a hypervisor can copy memory pages from source to destination while an associated VM remains operational at the source. Memory pages are re-copied until the rate of re-copied pages exceeds the rate of changed memory pages. Subsequently, the VM is stopped on the source, any detected changed memory pages are e-copied to the destination, and the VM is resumed on the destination. In the pre-copy memory migration, the VM may experience downtime in the range of milliseconds to seconds.

In the post-copy memory migration technique, a VM is suspended at the source and a subset of the execution state of the VM (e.g., CPU state, register, non-pageable memory, etc.) is transferred to the destination. The VM is subsequently resumed at the destination while the source performs pre-paging (e.g., pushing the remaining memory pages of the VM from the source to the destination). While executing on the destination, if the VM accesses a memory page that has not yet transferred to the destination from the source, a page-fault occurs which is redirected to the source, and the source provides the faulted page.

Operation 406 includes mitigating the malicious activity on the compromised application in a migrated single-tenant host. Operation 406 can include generating a notification, terminating the compromised application, terminating (or isolating) the migrated single-tenant host, and/or other mitigation activity.

Operation 408 includes archiving activity logs of the compromised application and benign applications previously running on the multi-tenant system. Operation 408 can preserve information relevant to an investigation of the duration, extent, and/or nature of the exploit. Furthermore, operation 408 can preserve tenant data (e.g., in cases where the compromised application is subsequently terminated on the migrated single-tenant host).

Operation 410 includes automatically performing a live migration of each benign tenant to a new multi-tenant host. As previously discussed, the live migration can be a pre-copy memory migration, a post-copy memory migration, or another live migration technique, now known or later developed. Advantageously, the method 400 reduces the chance of an exploit on a first tenant infecting other tenants on a multi-tenant host. Furthermore, the method 400 preserves availability of applications associated with benign tenants.

Figure 5:
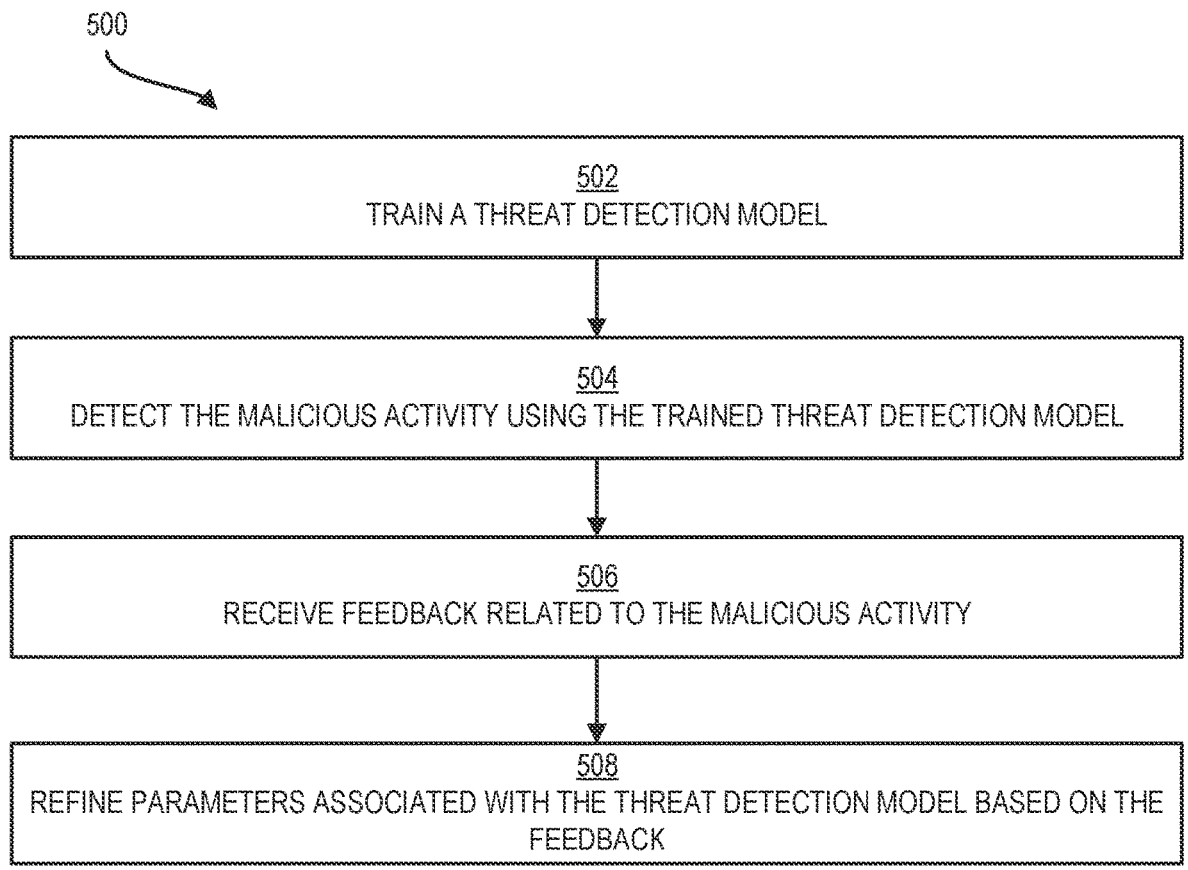
FIG. 5 illustrates a flowchart of an example method for training and refining a threat detection model for multi-tenant security, in accordance with some embodiments of the present disclosure.

FIG. 5 illustrates a flowchart of an example method 500 for training and refining a threat detection model for multi-tenant security, in accordance with some embodiments of the present disclosure. In some embodiments, the method 500 is implemented by a multi-tenant cloud security program, an exploit analysis system 110, a server, a computer, a processor, a combination of hardware and software, and/or a combination of any of the aforementioned. In some embodiments, the method 500 occurs in tandem with one or more operations of the method 400 of FIG. 4.

Operation 502 includes training a threat detection model. The threat detection model can be trained using any machine learning techniques previously mentioned, otherwise known, or later developed.

Operation 504 includes detecting the malicious activity using the trained threat detection model. As one example, operation 504 can detect malicious activity by matching a hash or digest of a known security exploit to a hash or digest of a running file, workload, and/or application in a multi-tenant host. As another example, operation 504 can detect malicious activity by matching a sequence of events and/or characteristics of a known security exploit to a sequence of events and/or characteristics observed on a running workload or application in a multi-tenant host. As yet another example, operation 504 can detect malicious activity by inputting numerous data into the trained threat detection model and receiving, as output from the trained threat detection model, an indication of an exploit (e.g., a type of exploit, a location of the exploit, etc.) in the multi-tenant host.

Operation 506 includes receiving feedback related to the malicious activity. For example, in response to transmitting a notification to a security administrator, the security administrator can identify the malicious activity as a true exploit or a false positive.

Operation 508 includes refining parameters associated with the threat detection model based on the feedback. For example, operation 508 can include retraining all or a portion of the threat detection model with the feedback included as additional training data. In other embodiments, parameters associated with the threat detection model can be manually or automatically tuned based on the feedback.

Figure 6:
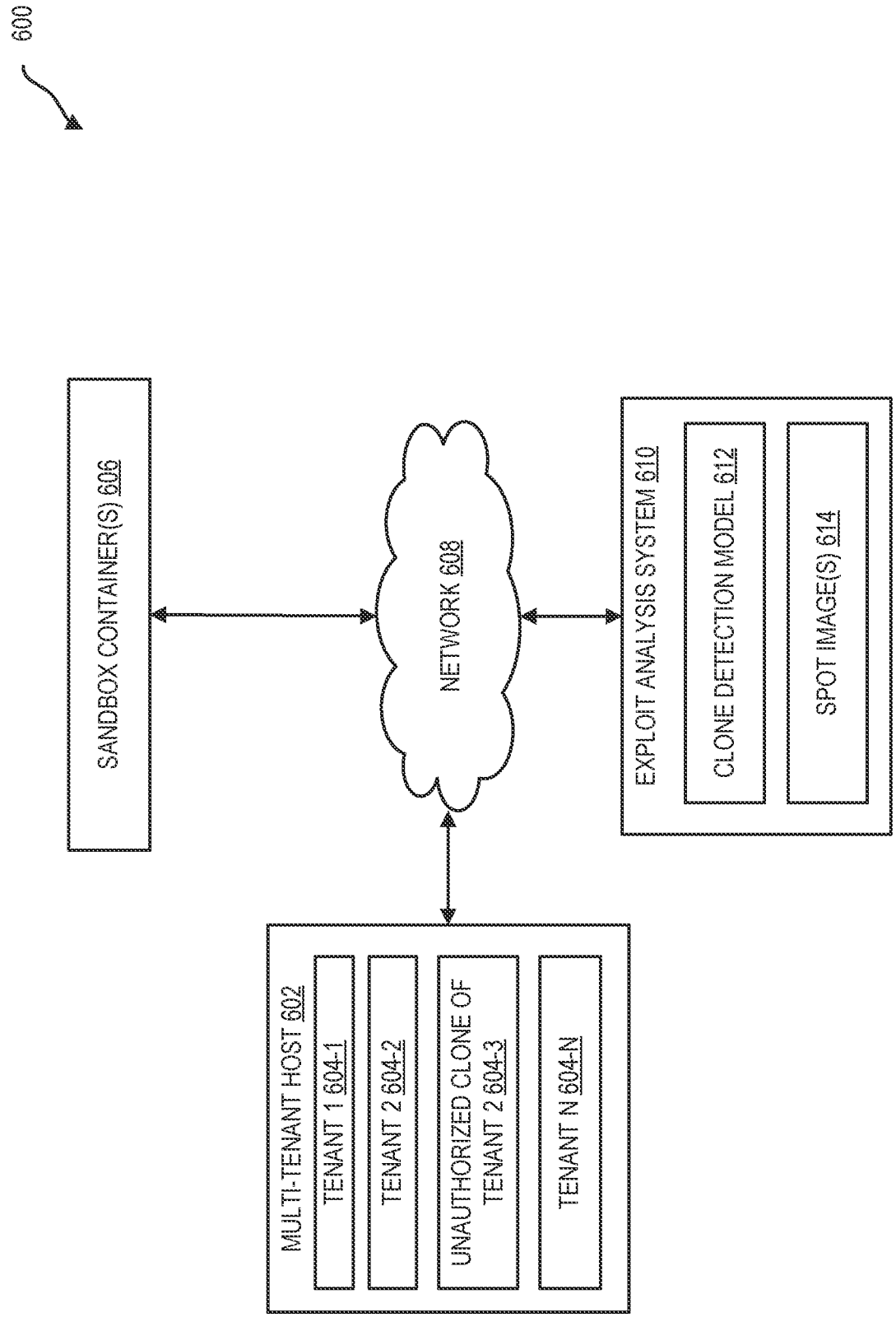
FIG. 6 illustrates a block diagram of an example computational environment implementing multi-tenant security upon identification of an unauthorized clone of a tenant, in accordance with some embodiments of the present disclosure.

FIG. 6 illustrates a block diagram of an example computational environment 600 implementing multi-tenant security upon identification of an unauthorized clone of a tenant, in accordance with some embodiments of the present disclosure. The example computational environment 600 includes a multi-tenant host 602, one or more sandbox containers 606, and an exploit analysis system 610 communicatively coupled to one another via a network 608. In some embodiments, the multi-tenant host 602 is consistent with multi-tenant host 102 of FIG. 1, the network 608 is consistent with network 108 of FIG. 1, and/or the exploit analysis system 610 is consistent with the exploit analysis system 110 of FIG. 1. The multi-tenant host 602 hosts multiple tenants 604 such as tenant 1 604-1, tenant 2 604-2, and tenant N 604-N, where N is any integer greater than or equal to one.

The exploit analysis system 610 can include a clone detection model 612, where the clone detection model 612 can detect unauthorized clones of tenants 604 in a multi-tenant host 602. In some embodiments, clone detection model 612 utilizes machine learning algorithms as previously discussed with respect to threat detection model 112 of FIG. 1. In some embodiments, the clone detection model 612 can utilize spot images 614 to identify an unauthorized clone of a tenant. Spot images 614 can refer to intermittent snapshots of tenants 604 which can be compared to each other to differentiate original tenants 604 from unauthorized clones of such tenants. For example, clone detection model 612 can detect unauthorized clone of tenant 2 604-3. Upon detection of an unauthorized clone of tenant 2 604-3, aspects of the present disclosure can utilize one or more sandbox containers 606 to limit the spread of malicious activity associated with the unauthorized clone of the tenant 2 604-3.

Figure 7:
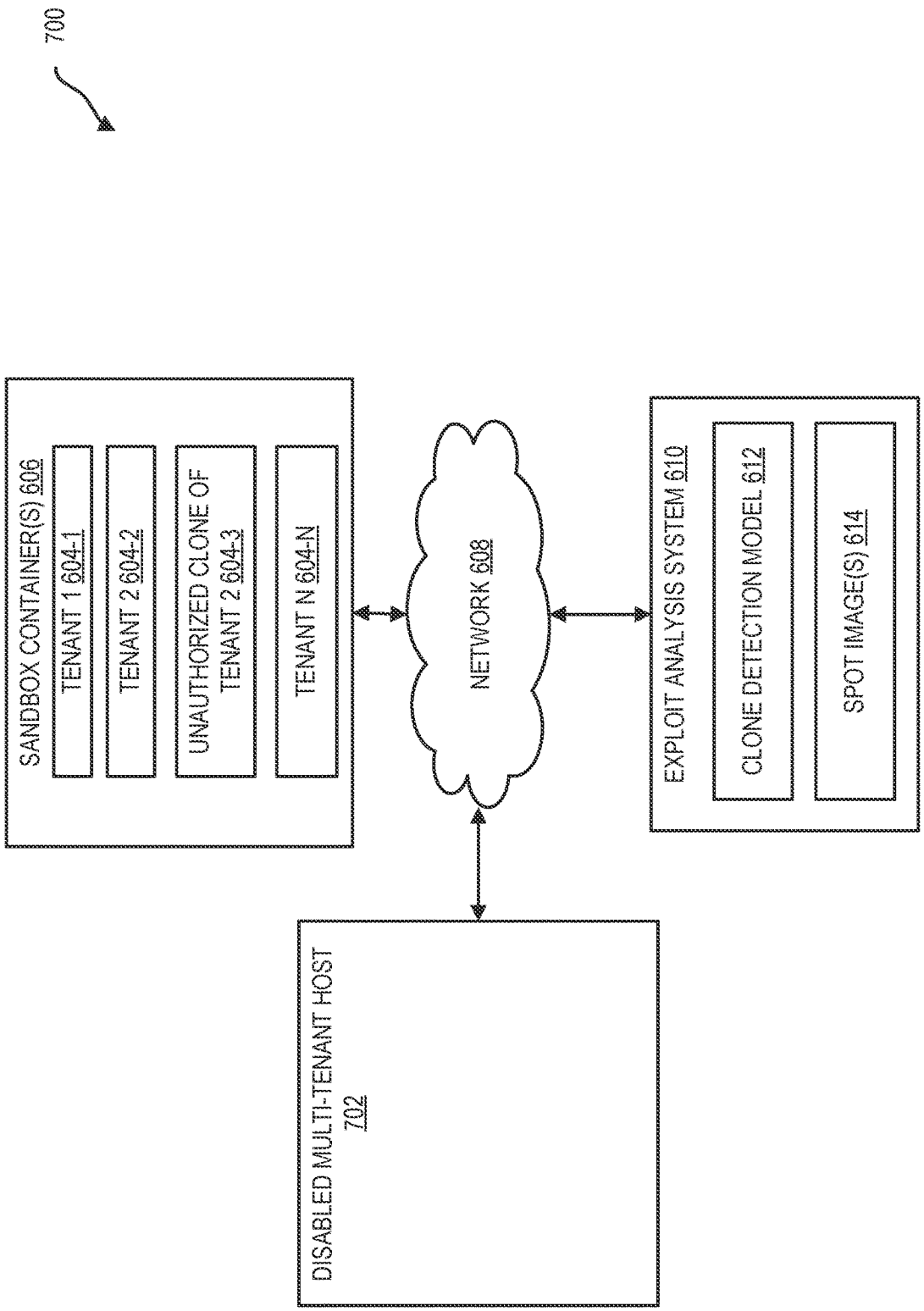
FIG. 7 illustrates a block diagram of an example computational environment implementing multi-tenant security upon isolation of the multiple tenants in one or more sandbox containers, in accordance with some embodiments of the present disclosure.

FIG. 7 illustrates a block diagram of an example computational environment 700 implementing multi-tenant security upon isolation of the multiple tenants 604 in one or more sandbox containers 606, in accordance with some embodiments of the present disclosure. In some embodiments, the computational environment 700 occurs subsequent to the computational environment 600 of FIG. 6.

In the computational environment 700, the multi-tenant host 602 is disabled as shown by disabled multi-tenant host 702. Furthermore, the tenants 604 are migrated (e.g., using live migration techniques) to one or more sandbox containers 606. Sandbox containers 606 can refer to network containers with preconfigured controls configured to limit spread or exploitation of malicious activity while enabling the tenants 604 to continue performing workloads. For example, when tenants 604 are placed in the sandbox container 606, they may have limitations such as restricted remote login functionality, restricted size for file uploads or downloads, restricted accesses (e.g., only read-only access), unaccepting of unknown connection requests, and/or other limitations useful for reducing an attack surface available to a malicious entity. While tenants 604 are in the sandbox container 606, they can be subjected to increased monitoring to identify and resolve any detected malicious activity. Such monitoring can be related to configurations, application behaviors, file behaviors, user behaviors, registry keys, traffic analysis, binary file analysis, and the like.

The sandbox containers 606 can be implemented as a new instance of the multi-tenant host 602 or on an entirely different host. Although a single sandbox container 606 is shown hosting all tenants 604, in other embodiments, multiple sandbox containers 606 are used where each sandbox container 606 hosts at least one tenant 604 but less than all tenants 604.

In some embodiments, tenants 604 remain in the sandbox container 606 for a preconfigured amount of time (e.g., 24 hours, 48 hours, etc.) with heightened monitoring, testing, and/or remediation protocols in place to mitigate any detected malicious activity. For example, in some embodiments, the exploit analysis system 610 can utilize spot images 614 to differentiate original tenant 2 604-2 from unauthorized clone of tenant 2 604-3. As a result of the differentiation, aspects of the present disclosure can (i) delete the unauthorized clone of tenant 2 604-3 and retain original tenant 2 604-2 if the original tenant 2 604-2 does not appear to be otherwise compromised; or (ii) delete both the original tenant 2 604-2 and the unauthorized clone of tenant 2 604-3 and create a reimaged tenant 2.

Figure 8:
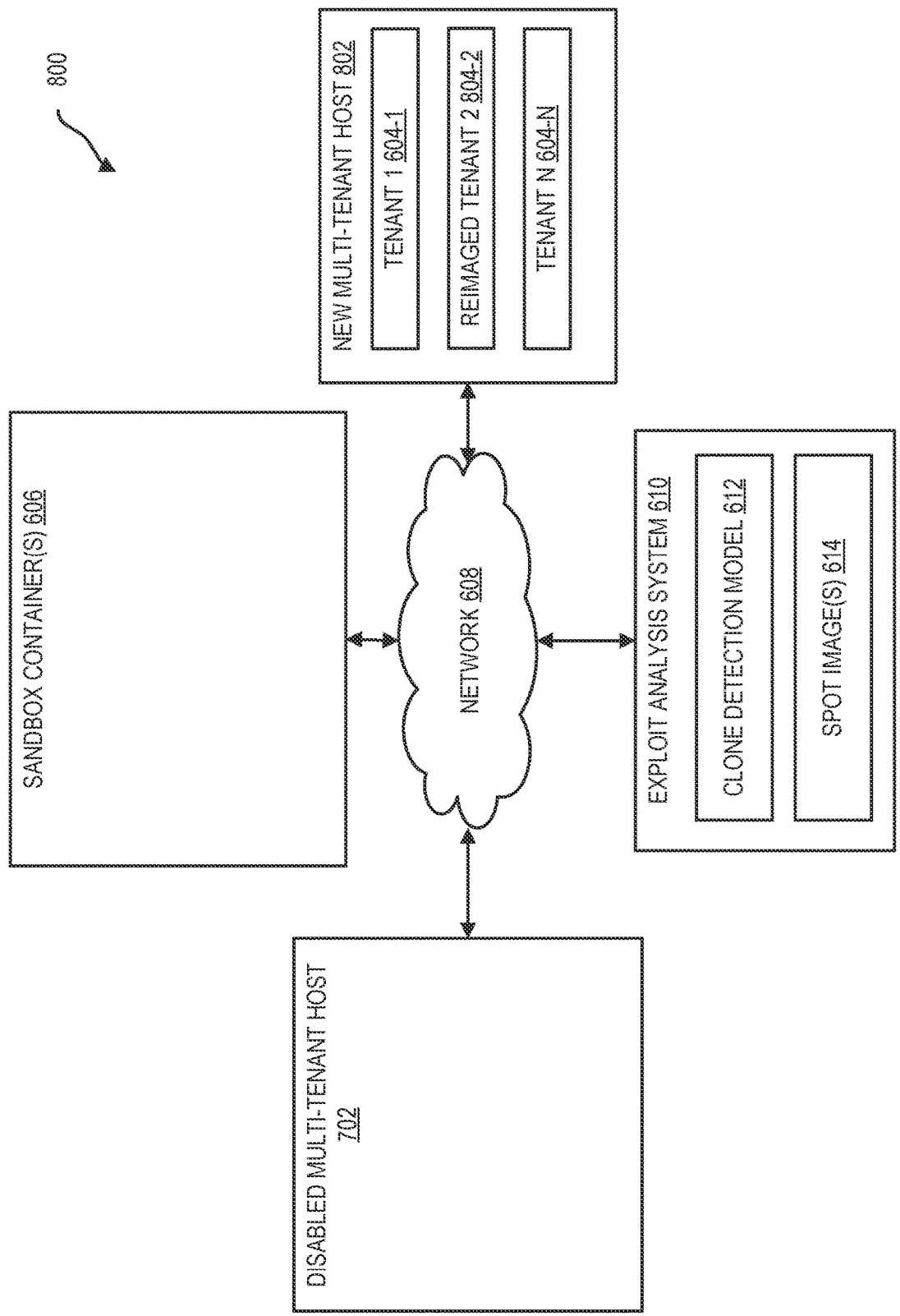
FIG. 8 illustrates a block diagram of an example computational environment implementing multi-tenant security upon reimaging the unauthorized clone and its associated tenant and implementing the reimaged tenant and other benign tenants on a new multi-tenant host, in accordance with some embodiments of the present disclosure.

FIG. 8 illustrates a block diagram of an example computational environment 800 implementing multi-tenant security upon reimaging the unauthorized clone and its associated tenant and implementing the reimaged tenant and other benign tenants on a new multi-tenant host 802, in accordance with some embodiments of the present disclosure. In some embodiments, the example computational environment 800 occurs subsequent to the example computational environment 700 of FIG. 7.

In the example computational environment 800, a new multi-tenant host 802 is created. The new multi-tenant host 802 can be a new instance of the original multi-tenant host 602 or an entirely different multi-tenant host. Aspects of the present disclosure can migrate (e.g., using live migration techniques) the benign tenants (e.g., tenant 1 604-1 and tenant N 604-N) to the new multi-tenant host 802. Furthermore, aspects of the present disclosure can instantiate a reimaged tenant 2 804-2 on the new multi-tenant host 802. The reimaged tenant 2 804-2 can replace the original tenant 2 604-2 and the unauthorized clone of tenant 2 604-3. The reimaged tenant 2 804-2 can be reimaged based on information in spot images 614 related to original tenant 2 604-2. For example, the reimaged tenant 2 804-2 can be based on a snapshot associated with original tenant 2 604-2 contained in spot images 614 that is not exploited.

Figure 9:
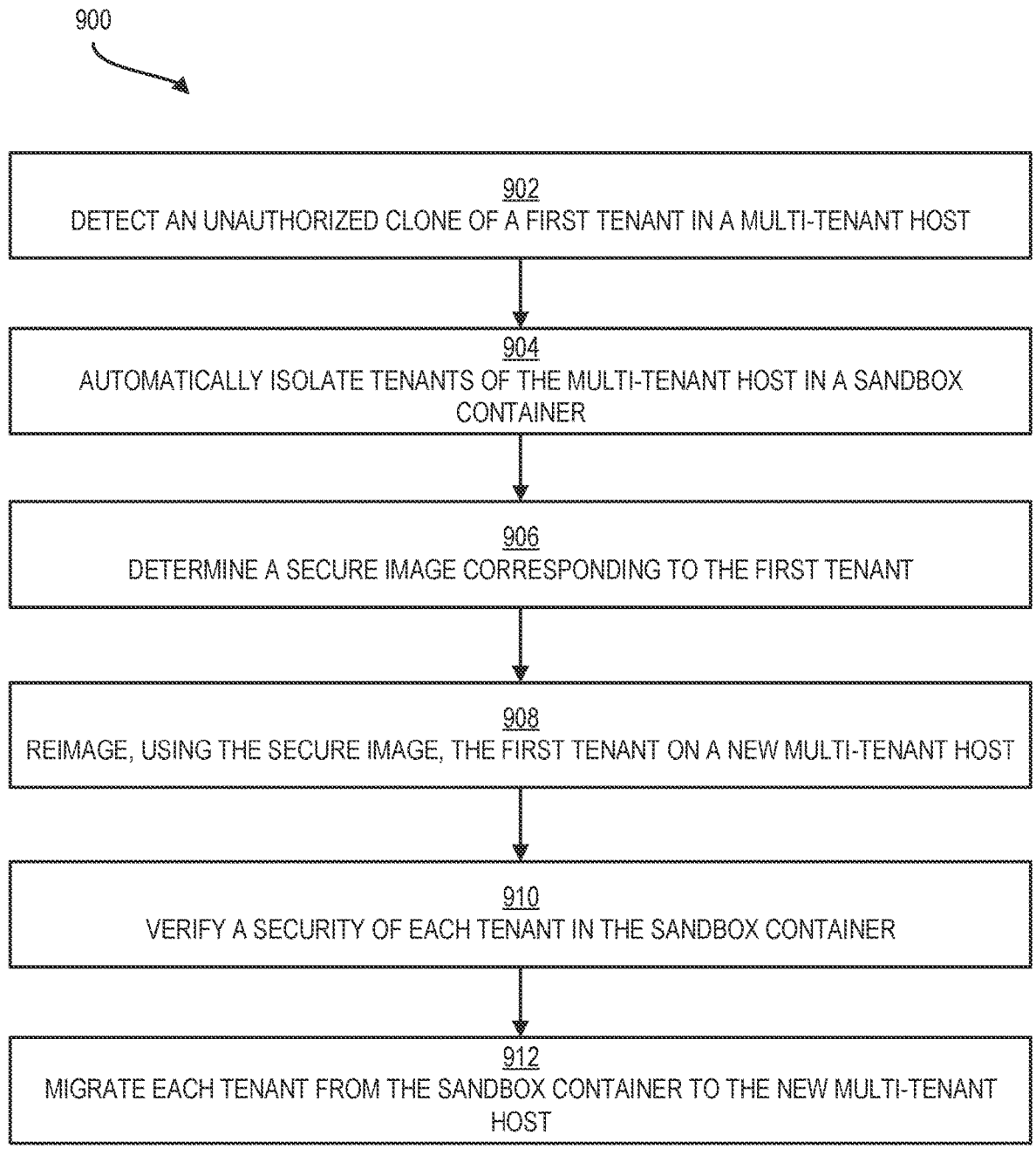
FIG. 9 illustrates a flowchart of an example method for implementing multi-tenant security using one or more sandbox containers, in accordance with some embodiments of the present disclosure.

FIG. 9 illustrates a flowchart of an example method 900 for implementing multi-tenant security using one or more sandbox containers, in accordance with some embodiments of the present disclosure. In some embodiments, the method 900 is implemented by a multi-tenant cloud security program, an exploit analysis system 610, a server, a computer, a processor, a combination of hardware and software, and/or a combination of any of the aforementioned.

Operation 902 includes detecting an unauthorized clone of a first tenant in a multi-tenant system. In some embodiments, operation 902 utilizes a clone detection model and/or one or more spot images (e.g., collections of snapshots of various tenants over time) to detect unauthorized clones. For example, operation 902 can randomly compare a current state of a tenant to a previous snapshot of the tenant in the spot images to detect possible unauthorized clones. Likewise, operation 902 can analyze security file configurations, registry changes, traffic behaviors, memory allocations, storage capacities, auto deletion functionalities, CPU usages, running services, password changes, executed scripts, application histories, startup services, disabled policies, file renaming, host names, storage locations, created files, file paths, binary libraries, modified dates and/or times, toolkits (e.g., vmkfstools), quiescing, creation dates/times, modified dates/times, accessed dates/time, and/or other information as part of detecting an unauthorized clone. In some embodiments, operation 902 utilizes a scoring function including some or all of the aforementioned characteristics to cumulatively determine a risk, likelihood, or probability of an unauthorized clone.

Operation 904 includes automatically isolating tenants of the multi-tenant system in one or more sandbox containers. The sandbox containers can be implemented as a new instance on the multi-tenant host or on a different host altogether. In some embodiments, operation 904 involves performing a live migration of tenants from the multi-tenant host to the sandbox container. The sandbox container can limit functionalities of tenants to restrict further malicious activity stemming from the exploit causing the unauthorized clone. However, the sandbox container nonetheless enables continued availability of the workloads associated with the tenants.

Operation 906 includes determining a secure image corresponding to the first tenant. Operation 906 can utilize spot images to identify an unexploited snapshot of the first tenant that can be used to reimage the first tenant.

Operation 908 includes reimaging, using the secure image determined in operation 906, the first tenant on a new multi-tenant host. The new multi-tenant host can be a new instance of the original multi-tenant host or a new host altogether.

Operation 910 includes verifying a security of each tenant in the sandbox container. Operation 910 includes verifying that each tenant remaining in the sandbox container, is, in fact, a benign tenant (e.g., not exploited by the exploit causing the unauthorized clone). In some embodiments, operation 910 includes implementing mitigation measures to remove any exploits on any other tenants in the sandbox container.

Operation 912 includes migrating each tenant from the sandbox container to the new multi-tenant host. In some embodiments, operation 912 performs a live migration as previously discussed.

Advantageously, FIGS. 6-8 illustrate embodiments of the present disclosure that can automatically detect malicious activity (e.g., unauthorized clones), isolate the tenants of a multi-tenant host including the malicious behavior in a sandbox container, resolve the malicious activity in the sandbox container while preserving utility of the tenants, and migrate the tenants to a new multi-host system following resolution of the malicious activity.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 10:
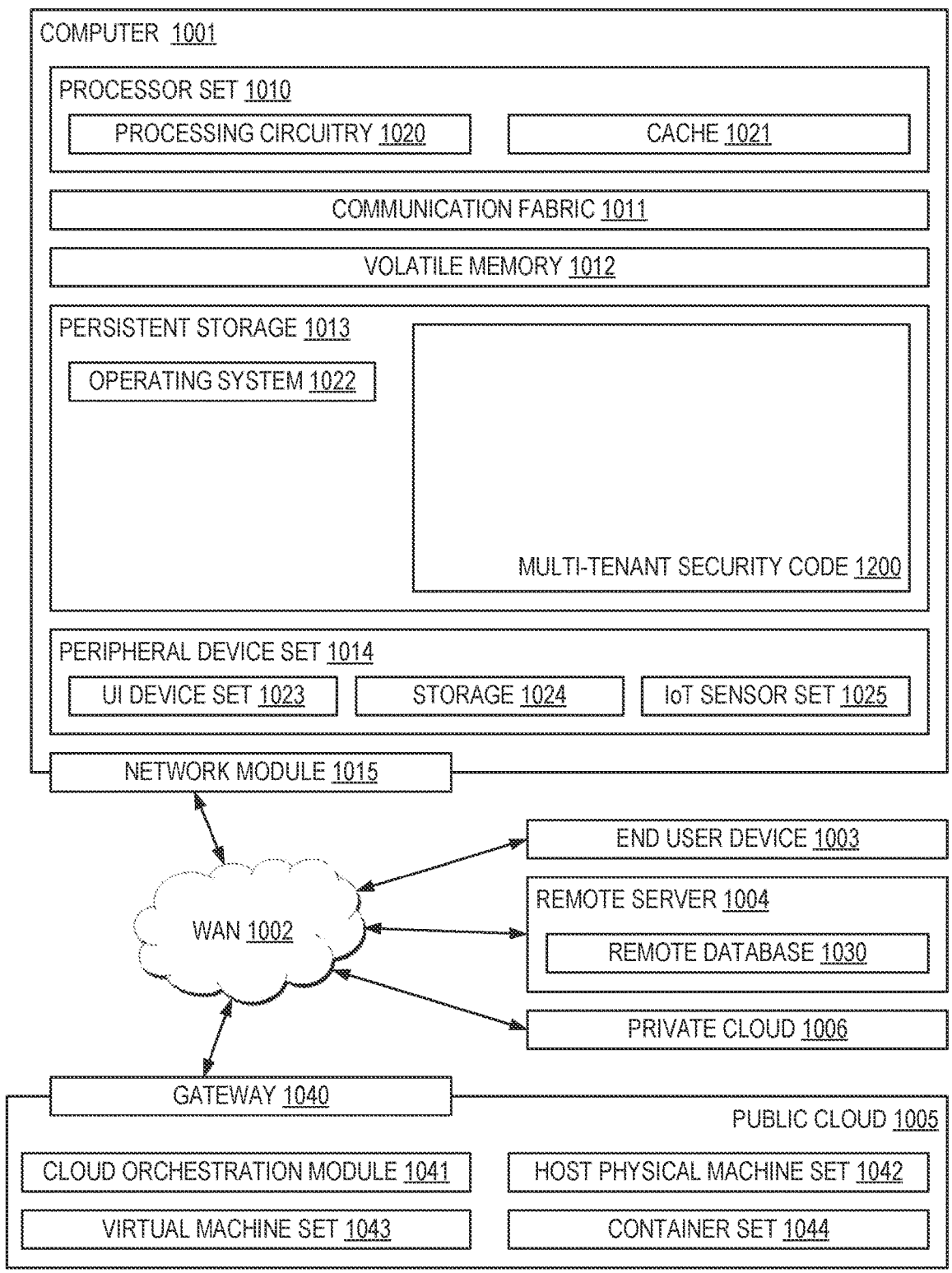
FIG. 10 illustrates a block diagram of an example computing environment, in accordance with some embodiments of the present disclosure.

FIG. 10 illustrates a block diagram of an example computing environment, in accordance with some embodiments of the present disclosure. Computing environment 1000 contains an example of an environment for the execution of at least some of the computer code involved in performing the inventive methods, such as multi-tenant security code 1200. In addition to multi-tenant security code 1200, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and multi-tenant security code 1200, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in multi-tenant security code 1200 in persistent storage 1013.

COMMUNICATION FABRIC 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface type operating systems that employ a kernel. The code included in multi-tenant security code 1200 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any software configured to perform any portion of the methods described previously and/or implement any of the functionalities described previously) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes detecting malicious activity on a compromised application in a multi-tenant host; automatically performing a live migration of each tenant of the multi-tenant host to a respective single-tenant host; mitigating the malicious activity on the compromised application that is migrated to a single-tenant host; and automatically performing another live migration of each benign tenant to a new multi-tenant host.

Example 2 includes the features of Example 1. In this example, the multi-tenant host comprises a plurality of virtual machines hosted on one or more shared servers, and wherein each respective single-tenant host comprises a dedicated server for a tenant associated with the respective single-tenant host.

Example 3 includes the features of any one of Examples 1 to 2. In this example, the malicious activity is detected using an activity signature.

Example 4 includes the features of any one of Examples 1 to 2. In this example, the malicious activity is detected using a machine learning model. Optionally, the method further comprises: transmitting a notification based on the malicious activity to a cybersecurity administrator; and updating parameters associated with the machine learning model based on feedback provided by the cybersecurity administrator.

Example 5 includes the features of any one of Examples 1 to 4, including or excluding optional features. In this example, the method further comprises archiving activity logs of the compromised application and benign applications running on the multi-tenant host.

Example 6 is a computer-implemented method. The method includes detecting an unauthorized clone of a first tenant in a multi-tenant host; automatically isolating tenants of the multi-tenant host in a sandbox container; determining a secure image corresponding to the first tenant; reimaging, using the secure image, the first tenant on a new multi-tenant host; verifying a security of each tenant in the sandbox container; and in response to verifying the security of each tenant in the sandbox container, migrating each tenant from the sandbox container to the new multi-tenant host.

Example 7 includes the features of Example 6. In this example, the sandbox container comprises restricted permissions and continued availability for workloads associated with each tenant of the multi-tenant host.

Example 8 includes the features of any one of Examples 6 to 7. In this example, the unauthorized clone is detected using a spot image based on a previous snapshot of the first tenant and a current snapshot of the first tenant.

Example 9 includes the features of any one of Examples 6 to 7. In this example, the unauthorized clone is detected using a machine learning clone detection model.

Example 10 is a system. The system includes one or more computer readable storage media storing program instructions; and one or more processors which, in response to executing the program instructions, are configured to perform a method according to any one of Examples 1 to 9, including or excluding optional features.

Example 11 is a computer program product. The computer program product includes one or more computer readable storage media, and program instructions collectively stored on the one or more computer readable storage media, the program instructions comprising instructions configured to cause one or more processors to perform a method according to any one of Examples 1 to 9, including or excluding optional features.

What is claimed is:

1. A computer-implemented method comprising:
   detecting malicious activity on a compromised application in a multi-tenant host;
   automatically performing a pre-copy memory migration of each tenant of the multi-tenant host to a respective single-tenant host, wherein the pre-copy memory migration re-copies changed memory pages until a rate of re-copied pages exceeds a rate of the changed memory pages;
   mitigating the malicious activity on the compromised application that is migrated to a single-tenant host; and
   automatically performing another pre-copy memory migration of each benign tenant to a new multi-tenant host.

2. The method of claim 1, wherein the multi-tenant host comprises a plurality of virtual machines hosted on one or more shared servers, and wherein each respective single-tenant host comprises a dedicated server for a tenant associated with the respective single-tenant host.

3. The method of claim 1, wherein the malicious activity is detected using a hash of a logged event sequence.

4. The method of claim 1, wherein the malicious activity is detected using a machine learning model.

5. The method of claim 4, wherein the method further comprises:
- transmitting a notification based on the malicious activity to a cybersecurity administrator; and
- updating parameters associated with the machine learning model based on feedback provided by the cybersecurity administrator.

6. The method of claim 1, further comprising:
- archiving activity logs of the compromised application and benign applications running on the multi-tenant host.

7. A system comprising:
- one or more computer readable storage media storing program instructions; and
- one or more processors which, in response to executing the program instructions, are configured to perform a method comprising:
  - detecting malicious activity on a compromised application in a multi-tenant host;
  - automatically performing a pre-copy memory migration of each tenant of the multi-tenant host to a respective single-tenant host, wherein the pre-copy memory migration re-copies changed memory pages until a rate of re-copied pages exceeds a rate of the changed memory pages;
  - mitigating the malicious activity on the compromised application that is migrated to a single-tenant host; and
  - automatically performing another pre-copy memory migration of each benign tenant to a new multi-tenant host.

8. The system of claim 7, wherein the multi-tenant host comprises a plurality of virtual machines hosted on one or more shared servers, and wherein each respective single-tenant host comprises a dedicated server for a tenant associated with the respective single-tenant host.

9. The system of claim 7, wherein the malicious activity is detected using a hash of a logged event sequence.

10. The system of claim 7, wherein the malicious activity is detected using a machine learning model.

11. The system of claim 10, wherein the method further comprises:
- transmitting a notification based on the malicious activity to a cybersecurity administrator; and
- updating parameters associated with the machine learning model based on feedback provided by the cybersecurity administrator.

12. The system of claim 7, further comprising:
- archiving activity logs of the compromised application and benign applications running on the multi-tenant host.

13. A computer program product comprising one or more computer readable storage media, and program instructions collectively stored on the one or more computer readable storage media, the program instructions comprising instructions configured to cause one or more processors to perform a method comprising:
- detecting malicious activity on a compromised application in a multi-tenant host;
- automatically performing a post-copy memory migration of each tenant of the multi-tenant host to a respective single-tenant host;
- mitigating the malicious activity on the compromised application that is migrated to a single-tenant host; and
- automatically performing another post-copy memory migration of each benign tenant to a new multi-tenant host.

14. The computer program product of claim 13, wherein the multi-tenant host comprises a plurality of virtual machines hosted on one or more shared servers, and wherein each respective single-tenant host comprises a dedicated server for a tenant associated with the respective single-tenant host.

15. The computer program product of claim 13, wherein the malicious activity is detected using a hash of a logged event sequence.

16. The computer program product of claim 13, wherein the malicious activity is detected using a machine learning model.

17. The computer program product of claim 16, wherein the method further comprises:
- transmitting a notification based on the malicious activity to a cybersecurity administrator; and
- updating parameters associated with the machine learning model based on feedback provided by the cybersecurity administrator.

18. The computer program product of claim 13, further comprising:
- archiving activity logs of the compromised application and benign applications running on the multi-tenant host.

19. A computer-implemented method comprising:
- detecting an unauthorized clone of a first tenant in a multi-tenant host;
- automatically isolating tenants of the multi-tenant host in a sandbox container;
- determining, based on spot images snapshots of the first tenant, a secure image corresponding to the first tenant;
- reimaging, using the secure image, the first tenant on a new multi-tenant system;
- verifying a security of each tenant in the sandbox container; and
- in response to verifying the security of each tenant in the sandbox container, migrating each tenant from the sandbox container to the new multi-tenant host.

20. The method of claim 19, wherein the sandbox container comprises restricted permissions and continued availability for workloads associated with each tenant of the multi-tenant host.

21. The method of claim 19, wherein the unauthorized clone is detected using a spot image based on a previous snapshot of the first tenant and a current snapshot of the first tenant.

22. The method of claim 19, wherein the unauthorized clone is detected using a machine learning clone detection model.

23. A computer program product comprising one or more computer readable storage media, and program instructions collectively stored on the one or more computer readable storage media, the program instructions comprising instructions configured to cause one or more processors to perform a method comprising:
- detecting an unauthorized clone of a first tenant in a multi-tenant host;
- automatically isolating tenants of the multi-tenant host in a sandbox container;
- determining, based on spot images snapshots of the first tenant, a secure image corresponding to the first tenant;
- reimaging, using the secure image, the first tenant on a new multi-tenant system;
- verifying a security of each tenant in the sandbox container; and in response to verifying the security of each tenant in the sandbox container, migrating each tenant from the sandbox container to the new multi-tenant host.

24. The computer program product of claim 23, wherein the sandbox container comprises restricted permissions and continued availability for workloads associated with each tenant of the multi-tenant host.

25. The computer program product of claim 23, wherein the unauthorized clone is detected using a spot image based on a previous snapshot of the first tenant and a current snapshot of the first tenant.

* * * * *